（12) United States Patent
Beaufort et al.

(10) Patent No.: US 11,166,413 B2
(45) Date of Patent: Nov. 9, 2021

(54) PRESSING MEANS GUIDING DEVICE AND PRESS

(71) Applicant: DEERE & COMPANY, Moline, IL (US)

(72) Inventors: David M. Beaufort, Arc les Gray (FR); Florian Benoit-Guerindon, Gray (FR)

(73) Assignee: DEERE & COMPANY, Moline, IL (US)

( * ) Notice: Subject to any disclaimer, the term of this patent is extended or adjusted under 35 U.S.C. 154(b) by 145 days.

(21) Appl. No.: 16/374,974

(22) Filed: Apr. 4, 2019

(65) Prior Publication Data

US 2019/0350138 A1    Nov. 21, 2019

(30) Foreign Application Priority Data

May 18, 2018 (DE) .......................... 102018207878.5

(51) Int. Cl.
| | |
|---|---|
| *A01F 15/14* | (2006.01) |
| *A01F 15/07* | (2006.01) |
| *A01F 15/12* | (2006.01) |
| *B65B 27/12* | (2006.01) |
| *A01D 89/00* | (2006.01) |

(52) U.S. Cl.
CPC .......... *A01F 15/141* (2013.01); *A01D 89/001* (2013.01); *A01F 15/07* (2013.01); *A01F 15/12* (2013.01); *B65B 27/12* (2013.01); *A01F 2015/077* (2013.01)

(58) Field of Classification Search
CPC .................................................. A01F 2015/186
See application file for complete search history.

(56) References Cited

U.S. PATENT DOCUMENTS

| | | | |
|---|---|---|---|
| 3,992,987 A | 11/1976 | Sereg | |
| 4,077,315 A * | 3/1978 | Meiers | A01F 15/07 |
| | | | 100/88 |
| 4,648,239 A * | 3/1987 | Geiser | A01D 75/18 |
| | | | 100/88 |
| 4,890,449 A | 1/1990 | Hering | |
| 2014/0116272 A1* | 5/2014 | De Craemer | A01F 15/18 |
| | | | 100/88 |

FOREIGN PATENT DOCUMENTS

| | | |
|---|---|---|
| DE | 19609926 A1 | 9/1997 |
| DE | 202014003633 U1 | 7/2015 |
| DE | 102015212482 A1 | 1/2017 |
| EP | 0948885 A1 | 10/1999 |

OTHER PUBLICATIONS

European Search Report issued in counterpart European Patent Application No. 19174865.6 dated Oct. 7, 2019 (7 pages).

* cited by examiner

*Primary Examiner* — Adam J Eiseman
*Assistant Examiner* — P Derek Pressley

(57) ABSTRACT

A press guiding device for a baler includes at least one continuous pressing device, at least two pressing segments, and at least one guiding device arranged at least partially between the pressing segments. The at least one guiding device is supported in a rotationally secure manner at or on a common axle with a roller.

17 Claims, 3 Drawing Sheets

PRESSING MEANS GUIDING DEVICE AND PRESS

RELATED APPLICATIONS

This application claims priority to German Patent Application Ser. No. 102018207878.5, filed May 18, 2018, the disclosure of which is hereby incorporated by reference in its entirety.

FIELD OF THE DISCLOSURE

The present disclosure relates to a pressing means guiding device for a baler, and in particular to a press for an agricultural baler having a housing and at least one continuous pressing means which is arranged in the housing and which has at least two pressing means segments.

BACKGROUND

Conventional pressing means guiding devices serve to position a continuous pressing means having at least two pressing means segments such as, for example, a pressing belt which is constructed in particular in two parts with respect to at least one roller which drives, guides or supports the pressing means (i.e., the roller of a press or the press) or to retain it in abutment with the roller, particularly including when the pressing means is not or no longer tensioned or pretensioned. To this end, a pressing means guiding device generally has at least one guiding means which is arranged or engages between segments of the pressing means. The device is connected by means of a carrier which is arranged below the pressing means to the baler or a frame of the baler. With such an arrangement, crop remains or other impurities accumulate and are deposited on or at the carrier or remain bonded thereto, which can lead to clogging of the press and an interruption of the operation.

These conventional presses are used both in agricultural and in industrial sectors. Corresponding agricultural presses serve, for example, to form crop bales (i.e., round bales) and often produce at least substantially round-cylindrical bales of crops, for example, in the form of straw, hay, chaff, etc. Industrial presses are used in the compression of waste, textiles or other materials or when they are pressed into bales.

SUMMARY

In the present disclosure, a pressing means device, or simply a pressing device, for a baler includes at least one continuous pressing apparatus or means, at least two pressing segments, and at least one guiding device or means which is arranged at least partially between the pressing segments and which is supported in a rotationally secure manner at or on a common axle with a roller. In this manner, a guiding device or means may be provided for the pressing device or means or for the guiding segment(s), without additional support having to be provided for this purpose below the roller or the pressing device or means, for example, in the form of a carrier or a retention member for the guiding device or means, on which crops, crop remains, dirt, dust or other material may accumulate. As a result of the arrangement set out, accumulations or deposits in the region of the pressing means guiding device can consequently be counteracted or prevented. The continuous pressing means may, for example, be a chain or any other suitable pressing means. However, in particular, the pressing device or means is constructed in the manner of a pressing belt. The pressing device or means may be constructed in two parts or also in multiple parts or may have two or more pressing means segments which are preferably arranged beside each other or adjacent to each other.

It is particularly advantageous for the guiding device or means to be received at or on the axle in a rotationally secure manner so that the position of the guiding device or means is stationary with respect to the axle or the roller. This may, for example, be achieved by the guiding device or means being connected to the axle in a materially engaging manner, for example, welded. In a simple manner, however, this can be achieved by the guiding device or means being received at or on the axle in a positive-locking manner.

The roller may be any type of rollers which are provided in a press. However, it may be constructed in the manner of a scraper roller. A scraper roller may be associated with a pressing device or means or a roller of the press in order to scrape or scratch away material which has accumulated or bonded thereon or to counteract or prevent a depositing, accumulation, or bonding of material on the pressing device or means or the roller. It is particularly advantageous for the roller to be rotatably supported on or about the axle, wherein the axle has at least partially a cross-section which is constructed in the manner of a polygon, in particular hexagonal.

It is conceivable for only a single guiding device or means to be provided. It is particularly advantageous, however, if a plurality of guiding devices or means are provided, wherein at least one of the guiding device or means is supported on or at the axle. If the guiding device or means are connected by at least one guiding device or means support, this can increase the stability of the pressing means guiding device.

If the pressing means guiding device has a plurality of guiding devices or means, two of the guiding devices or means may be arranged adjacent to outer edge regions of the pressing device or means and may be provided directly or indirectly on a frame of the baler or a carrier which is in particular pivotably connected to the frame, wherein one or more additional guiding device or means is arranged at least partially between the pressing segments and supported on or at the roller. The external guiding device or means may be, for example, screwed or otherwise securely connected to the frame or the carrier.

If the roller has at least two roller segments, the (at least one of the) guiding device or means may be arranged at least partially between the roller segments and in this manner position a respective pressing segment with respect to a corresponding roller segment.

If at least one shoulder piece is provided adjacent to the guiding device or means, the position of the guiding device or means with respect to the roller or (a) single roller segment(s) or the position of the roller or the roller segments can thereby be adjusted. Alternatively or additionally, the shoulder piece may also prevent the pressing device or means or a pressing segment from becoming squashed or jammed between the (rotatable) roller and the stationary guiding device or means. The shoulder piece is supported on or at the axle directly or indirectly, but in a rotationally secure or positive-locking manner.

The or at least one of the guiding device or means may engage at one end, in particular in a rigid manner, on the guiding means support. However, it is also conceivable for the guiding means support to be connected to the guiding device or means in a movable, for example, rotatable manner.

It is particularly advantageous for a press having a housing and at least one continuous pressing device or means which is arranged in the housing and which has at least two pressing segments to have such a pressing means guiding device. In this manner, adhesions or deposits of material or occurrences of clogging in the region of the pressing means device and consequently undesirable downtimes of the press can be counteracted. The press is in particular an agricultural baler for forming round-cylindrical bales. However, the press may also be used in the industrial sector, for example, for forming bales of paper, waste, fabric or other materials.

The press has, in addition to the roller, at least one additional roller. If the roller which is constructed in particular as a scraper roller is associated with the additional roller, the roller can cooperate with the additional roller, in particular, in such a manner that the roller which is constructed as a scraper roller counteracts deposits and adhesions of material, in particular crop remains, dirt, dust, etcetera, on the additional roller or the pressing device or means, prevents them or scratches or scrapes away material which has already been deposited on the additional roller, pressing device or means or material which has bonded thereto.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
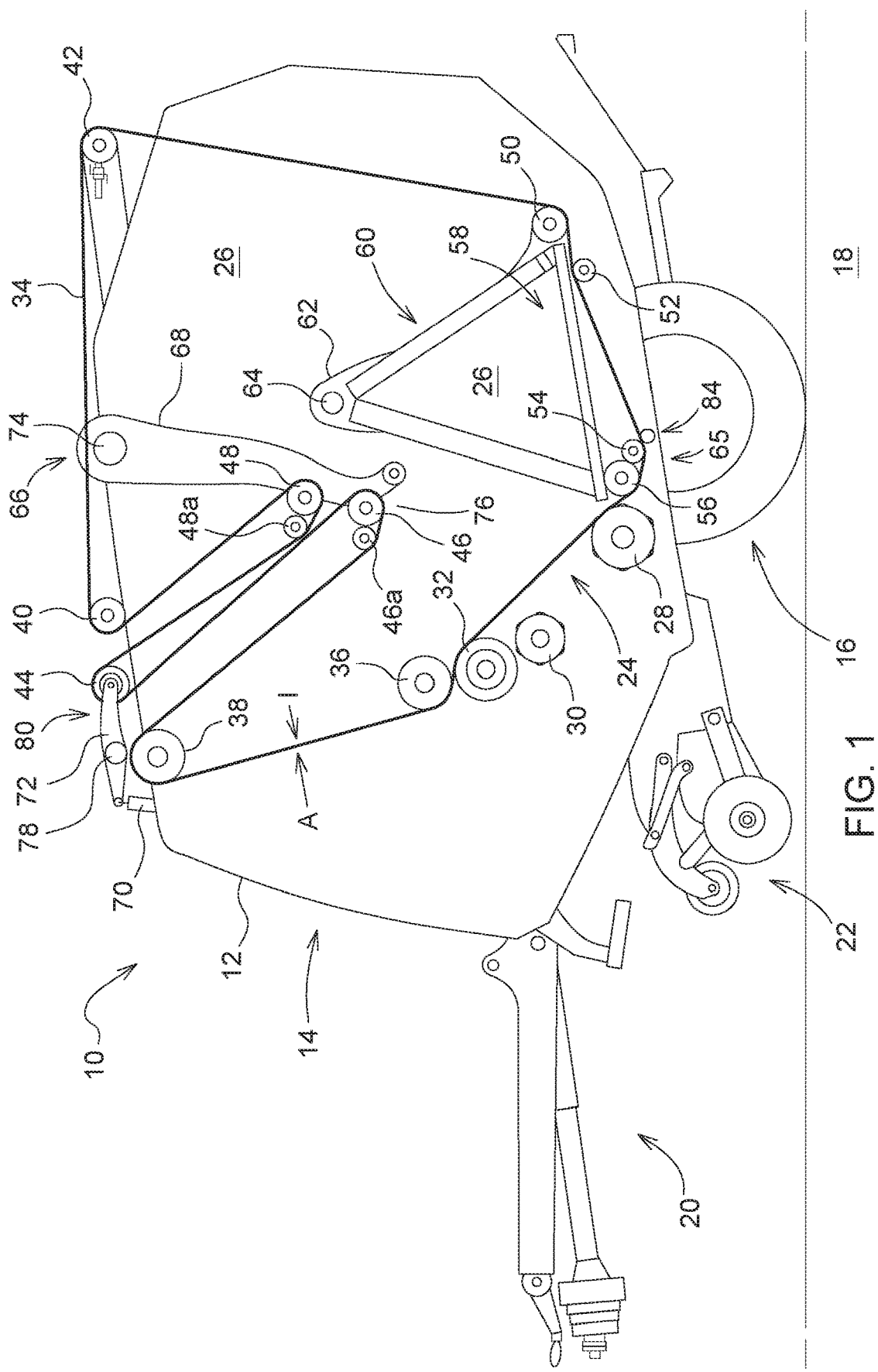
FIG. 1 is a side view of a press with different rollers, a pressing device or means and a pressing means guiding device.

In FIG. 1, a first embodiment of a press 10 is shown having a frame 14 carrying a housing 12 and which is supported via a chassis 16 on the ground 18. The press 10 shown is constructed in the manner of a baler and can be used both in the agricultural and industrial sectors for producing a bale (e.g., cylindrical bale) of crops, but also of waste, paper, material or fabric, cotton, tobacco, etc. The press 10 may be pulled by a working vehicle which is not shown, but may be in the form of a tractor or may also be constructed to be self-driving.

According to the present embodiment, on the front side of the frame 14 a towbar 20 is provided in order to suspend the press 10 on a tractor and to be able to pull it over a field. A receiving device 22 in the form of a pick-up serves to receive crop lying on the ground 18, for example, hay or straw which has been deposited in a swath. The crop received by the receiving device 22 is supplied via an inlet 24 to a baling chamber 26 and rolled up helically at that location to form a round-cylindrical bale (see FIG. 2), bound and subsequently deposited on the ground 18.

At the inlet 24 of the baling chamber 26, a lower stationary roller 28 and two upper rollers 30, 32 are positioned. The baling chamber 26 is further formed by a continuous pressing device or means 34 which, in accordance with the present embodiment, is constructed in the form of two mutually adjoining pressing belts which are beside each other and which are referred to below as pressing means segments 34a, 34b, or simply pressing segments, and is guided around a number of fixed rollers 36, 38, 40, 42 and movable rollers 44, 46, 48, 50, 52, 54, 56. The pressing device 34 has an outer side A facing the frame 14 and an inner side I.

While the baling chamber 26 is surrounded at the peripheral side substantially by the pressing device 34 and the rollers 28, 30 and 32, it is delimited laterally by side walls which are not shown.

Four rollers 50, 52, 54, 56 of the movable rollers 44-56 are supported so as to be able to be freely rotated in a lower region 58 of a delta-shaped carrier 60 which is articulated about the upper tip 62 thereof so as to be able to be pivoted about an axle 64 which extends horizontally and transversely relative to the forward direction and which can be moved with an actuator (not shown) from the bale forming position illustrated in FIG. 1 into a bale ejection position which is pivoted backwards and upwards, wherein the roller 54 (which is referred to below as the first roller 54) is constructed as a scraper roller, as will be described in greater detail below. In a state adjacent to the first roller 54, a pressing means guiding device 65 (hereinafter referred to as a press guiding device) is provided, which will be discussed below in greater detail.

A clamping mechanism 66 for tightening the pressing device 34 has a clamping lever 68 which cooperates with a first clamping element which is not shown and a clamping arm 72 which cooperates with a second clamping element 70. Both the clamping element (which is not shown) and the clamping element 72 may generally be constructed as a mechanical spring or as a hydraulic motor or have both.

The clamping lever 68 is supported in the region of the side walls (not shown) about an axle 74 which extends horizontally and transversely relative to the forward direction and carries in an end region 76 facing away from the axle 74 two of the movable rollers 46, 48 and cleaning rollers 46a, 48a which are associated with these rollers 46, 48. The clamping arm 72 is accordingly supported about a clamping arm axle 78 and carries in an end region 80 one of the movable rollers 44. Furthermore, the clamping arm 68 is operationally connected at one end to the clamping element 70 which is connected at the other end thereof to the press 10 or the frame 14 thereof in a manner not shown.

The pressing device 34 is always placed by means of the clamping arm 70 so firmly against the rotatably driven fixed roller 38 that the entrainment thereof is ensured. The roller 36 is also rotatably driven. The pressing device 34 assumes an initial state, in which it bridges the inlet 24 when stretched linearly, and an end state, in which it wraps around a bale in the manner of a large loop. The baling chamber 26 can consequently be changed in terms of its size, that is to say, the diameter thereof increases with the size of the bale. The bale is located while it is formed in the baling chamber 26 and is predominantly surrounded by the pressing device 34 but falls backwards out of the baling chamber 26 onto the ground 18 as soon as the carrier 60 with the movable rollers 50-56 pivots upwards in a counter-clockwise direction. Alternatively, the bale can also be placed on a device which is arranged downstream of the press 10.

Figure 2:
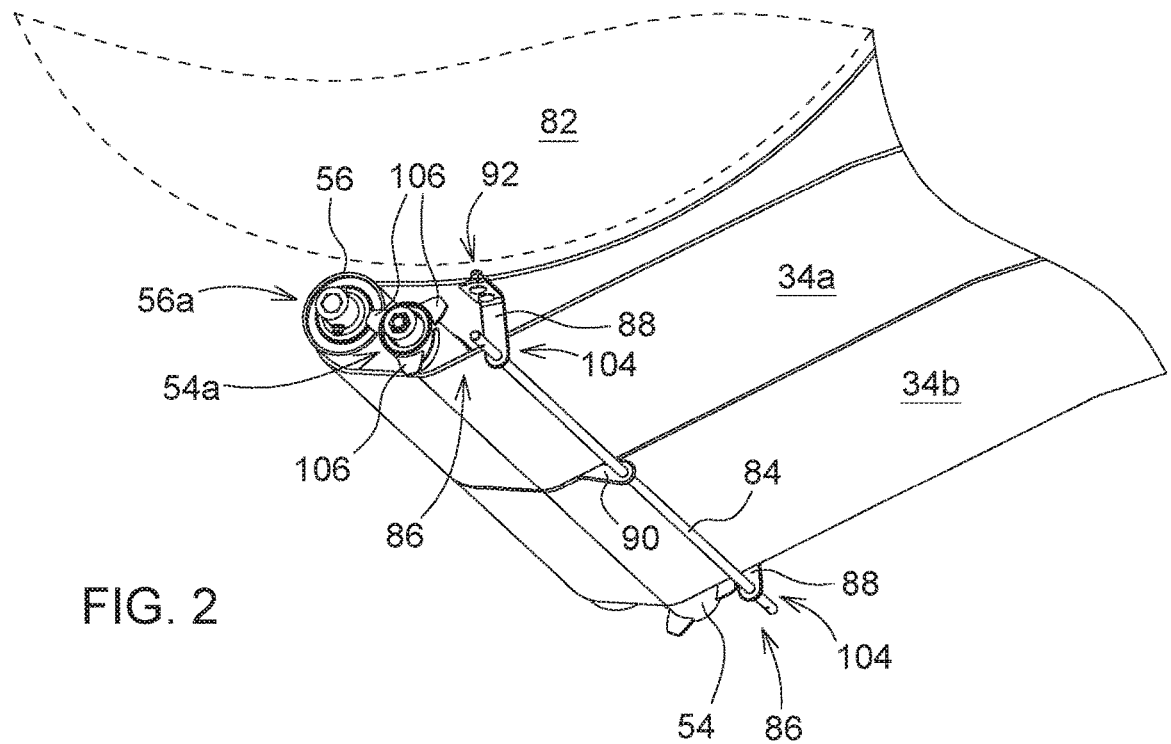
FIG. 2 is an enlarged illustration of the pressing means guiding device of a first roller, an additional roller which is associated with the first roller and a pressing device or means which has two pressing segments when viewed from below, wherein the pressing means is shown in a position which it assumes when a bale is formed in the press.

Reference is now made to FIG. 2 of the drawings in which the first roller 54 (which is referred to below as the additional roller 56), the pressing device 34 and the press guiding device 65 are illustrated in greater detail. According to the illustrated embodiment, the pressing device 34, as described above, is constructed in two parts and has two pressing segments 34a, b which are arranged substantially beside each other. In the shown position, which it assumes when in the press 10 or the baling chamber 26, a bale 82 which is only schematically illustrated is formed, the pressing device 34 substantially wraps round the rollers 54 and 56; if there is no bale 82 in the baling chamber 26 or if the formation of the bale 82 is still in an initial stage, the pressing device 34 adjoins the rollers 54, 56.

The press guiding device 65 has a guiding means support 84, or simply guiding support 84, which is constructed in the manner of a rod, two external guiding means or devices 88 which are arranged in edge regions 86 of the pressing device 34 and an internal or central guiding device or means 90. The external guiding devices 88 are securely connected in an end region 92 facing the bale 82 to the carrier 60, in particular screwed, and are therefore also arranged in a stationary manner even when the carrier 60 is pivoted with respect to the rollers 54, 56.

Figure 3:
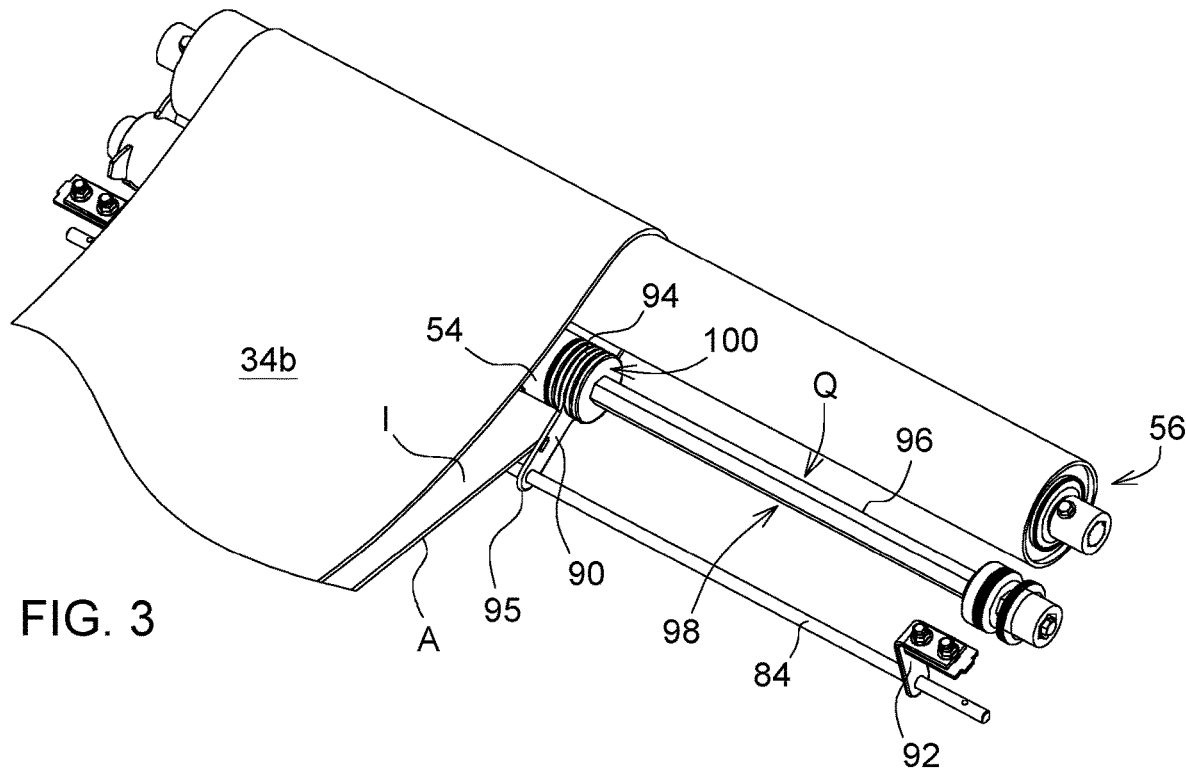
FIG. 3 is an illustration according to FIG. 2 when viewed from above, where one of the roller segments of the first roller which has two roller segments and one of the pressing segments of the pressing device or means which has two pressing segments is not illustrated for the sake of clarity.
Figure 4:
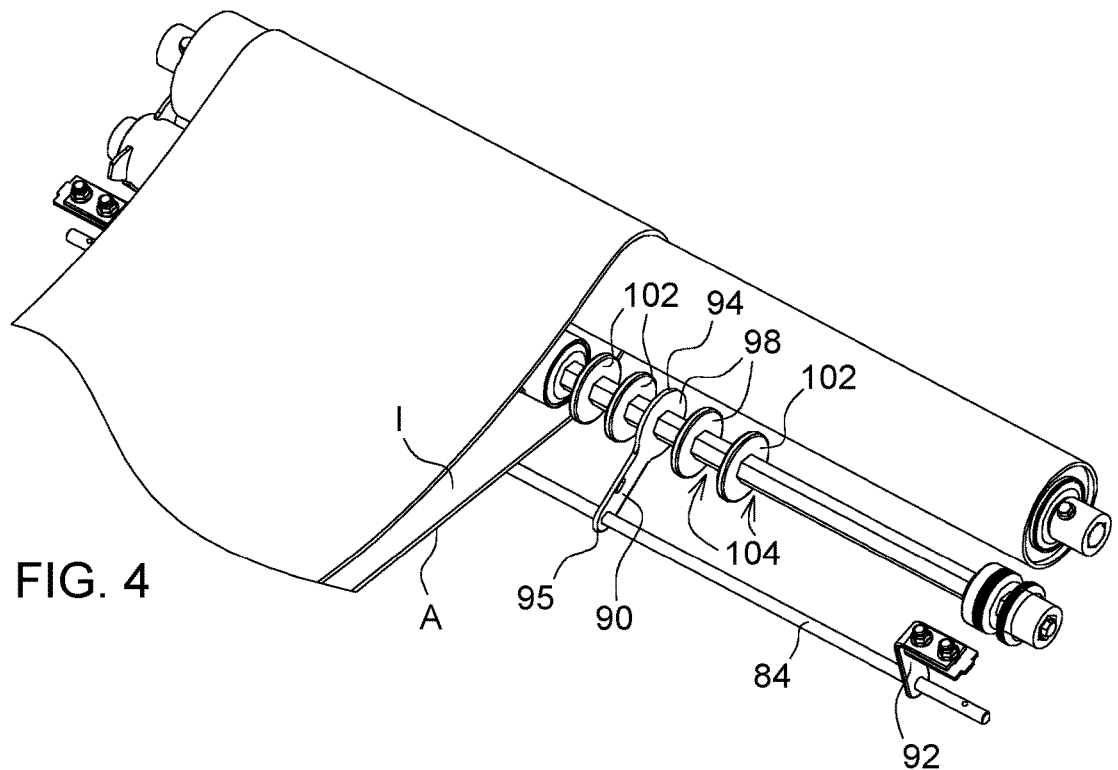
FIG. 4 is a partially exploded view of the components according to FIG. 3.

Referring to FIGS. 3 and 4, only one of the pressing segments 34a, b is shown so that the rollers 54, 56 which are located below and the central guiding device 90 are made visible. In this instance, the central guiding means 90 has an end region 94 which faces the bale 82 and which is connected in a rotationally secure manner to an axle 96 which is connected in particular in a rigid manner to the carrier 60 and on which the roller 54 or the roller segments 54a, b of the first roller 54, which is constructed in a divided manner, are rotatably supported. In the assembled state, the central or internal guiding device 90 is arranged between the roller segments 54a, b and extends between the pressing segments 34a, 34b outwards away from the bale 82. The guiding support 84 is coupled to a second end region 95 of the central guiding device 90. The guiding support 84 is positioned adjacent to the outer side A of the pressing segments 34a, 44b, whereas the axle, 96, the roller 54, and the first end region 94 of the central guiding device 90 are positioned adjacent to the inner side I of the pressing segments 34a, 34b.

Figure 5:
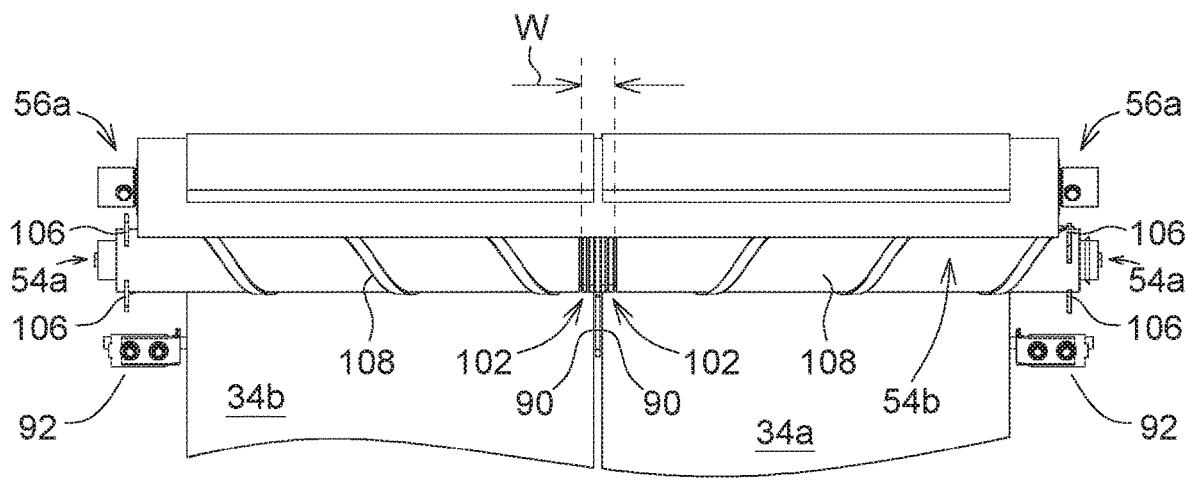
FIG. 5 is an illustration according to FIG. 2 when viewed from above, wherein an upper portion of the pressing means is not shown in order to make the components located therebelow visible.

To this end, the end region 94 of the internal guiding device 90 has an opening 100 which is constructed in the manner of a hexagonal polygon 98 and which corresponds to or cooperates with a cross-section Q of the axle 96 which is also constructed, for example, in a hexagonal manner. At both sides of the end region 94, there are provided on the axle 96 shoulder pieces 102 which are also connected in a rotationally secure manner via a hexagonal opening 104 to the axle 96 or the cross-section Q thereof and which, as shown in FIG. 5, require a spacing W between the roller segments 54a, b. As a result of a provision of shoulder pieces 102 of different thicknesses or also a plurality of shoulder pieces 102, the spacing W can be regulated, varied or adapted (i.e., centered) with respect to the requirements, for example, the width of the pressing device 34, the respective pressing segments 34a, b, or the position of the internal guiding device 90. In a position opposite the end regions 92, 94, the guiding devices 88, 90 each have an outer end region 104 which carries the guiding support 84.

With reference to FIG. 5, it is further shown that the roller 54 in the regions thereof facing the housing 12 of the press 10 or at the end sides 54a thereof is provided with three blades 106 which extend outwards away from the axle 96 and which are arranged in a uniform manner with respect to a roller periphery 54b. The blades 106 engage over the end sides 56a of the roller 56 and the pressing device 34 such that they can remove crop remains, deposits or accumulations therefrom or can prevent an accumulation of crop remains, impurities, etc., thereon. On the periphery 54b of the rollers 54, there are further provided helical deflectors 108 which can also prevent a deposit or accumulation of crop remains, dirt, or the like, on the pressing device 34 or the roller 56 or where applicable can remove deposits or accumulations from the pressing device 34 or the roller 56.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A press guiding device for a baler, comprising:
   a frame;
   an axle attached to the frame;
   a roller supported on the axle;
   a continuous pressing device having at least two pressing segments contacting the roller, wherein each of the at least two pressing segments include a respective first surface positioned in contact with the roller and a respective second surface disposed opposite the first surface;
   a central guiding device arranged at least partially between the pressing segments and having a first end region fixedly secured to the axle against rotation relative to the axle, and with the axle supporting the roller in contact with the respective first surfaces of the at least two pressing segments;
   wherein the central guiding device extends from the first end region to a second end region positioned adjacent the respective second surfaces of the at least two pressing segments; and
   a guiding support positioned in contact with the respective second surfaces of the at least two pressing segments and coupled to the second end region of the central guiding device, the guiding support extending laterally relative to the at least two pressing segments and attached to the frame adjacent lateral edge regions of the continuous pressing device, wherein the continuous pressing device contacts the guiding support and the roller consecutively without contacting another roller or another support therebetween.

2. The press guiding device according to claim 1, wherein the central guiding device is fixedly secured to the axle with a positive-locking mechanical engagement therebetween.

3. The press guiding device according to claim 1, wherein the roller is a scraper roller.

4. The press guiding device according to claim 1, wherein the roller is rotatably supported on the axle.

5. The press guiding device according to claim 1, wherein the axle comprises a cross-sectional shape defining a polygon.

6. The press guiding device according to claim 1, further comprising an external guiding device connected to the guiding support at the lateral edge regions of the continuous pressing device.

7. The press guiding device according to claim 6, wherein the external guiding device comprises at least a first external guiding device and a second external guiding device, where the first and second external guiding devices are arranged relative to each other at opposing ends of the guiding support and adjacent to respective lateral edge regions of the continuous pressing device.

8. The press guiding device according to claim 7, wherein the first and second external guiding devices are coupled to the frame.

9. The press guiding device according to claim 8, wherein the first and second external guiding devices are attached to a carrier, the carrier being pivotally connected to the frame.

10. The press guiding device according to claim 1, wherein the roller comprises at least two roller segments, and the central guiding device is arranged at least partially between the at least two roller segments.

11. The press guiding device according to claim 1, further comprising at least one shoulder piece provided in a position adjacent to the central guiding device and fixedly secured to the axle against rotation relative to the axle.

12. A baler for forming a bale, the baler comprising:
a chassis;
a housing supported by the chassis;
a pickup device coupled to the chassis and configured to collect crop;
an axle coupled to the chassis;
a roller supported on the axle;
a continuous pressing device having at least two pressing segments contacting the roller, wherein each of the at least two pressing segments include a respective first surface positioned in contact with the roller and a respective second surface disposed opposite the first surface and facing away from the roller;
a central guiding device arranged at least partially between the pressing segments and having a first end region fixedly secured to the axle against rotation relative to the axle, and with the axle supporting the roller in contact with the respective first surfaces of the at least two pressing segments;
wherein the central guiding device extends from the first end region to a second end region positioned adjacent the respective second surfaces of the at least two pressing segments; and
a guiding support positioned in contact with the respective second surfaces of the at least two pressing segments and coupled to the second end region of the central guiding device, the guiding support extending laterally relative to the at least two pressing segments and attached to the chassis adjacent lateral edge regions of the continuous pressing device,
wherein the continuous pressing device contacts the guiding support and the roller consecutively without contacting another roller or another support therebetween.

13. The baler of claim 12, further comprising a first external guiding device and a second external guiding device, where the first and second external guiding devices are arranged adjacent to the lateral edge regions of the continuous pressing device.

14. The baler according to claim 12, wherein the central guiding device is fixedly secured to the axle with a positive-locking mechanical engagement therebetween.

15. The baler according to claim 13, wherein the first and second external guiding devices are coupled to the chassis.

16. The baler according to claim 15, wherein the first and second external guiding devices are attached to a carrier, the carrier being pivotally connected to the chassis.

17. The press guiding device according to claim 5, wherein the first end region of the central guiding device includes an opening having a cross sectional shape corresponding to the polygonal cross sectional shape of the axle such that the central guiding device is fixedly secured to the axle against rotation relative to the axle.

* * * * *